United States Patent
On (10) Patent No.: US 8,248,491 B2
(45) Date of Patent: Aug. 21, 2012

(54) MOVING IMAGE NOISE REDUCTION PROCESSING APPARATUS, COMPUTER-READABLE RECORDING MEDIUM ON WHICH MOVING IMAGE NOISE REDUCTION PROCESSING PROGRAM IS RECORDED, AND MOVING IMAGE NOISE REDUCTION PROCESSING METHOD

(75) Inventor: Seigo On, Hachioji (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 12/816,677

(22) Filed: Jun. 16, 2010

(65) Prior Publication Data

US 2010/0253811 A1    Oct. 7, 2010

Related U.S. Application Data

(63) Continuation of application No. PCT/JP2008/072339, filed on Dec. 9, 2008.

(30) Foreign Application Priority Data

Dec. 17, 2007  (JP) .................................. 2007-325156

(51) Int. Cl.
  *H04N 5/217* (2011.01)
  *G06K 9/40* (2006.01)
(52) U.S. Cl. .......................... 348/241; 348/607; 382/275
(58) Field of Classification Search .................. 348/241, 348/242, 607, 615, 618, 619, 622; 382/274, 382/275
See application file for complete search history.

(56) References Cited

U.S. PATENT DOCUMENTS

| | | | | |
|---|---|---|---|---|
| 6,067,125 A * | 5/2000 | May | ............................. | 348/607 |
| 6,999,634 B2 * | 2/2006 | Hong | ............................. | 382/275 |
| 7,130,481 B2 * | 10/2006 | Yu | ............................. | 382/261 |
| 7,145,607 B1 * | 12/2006 | Hui | ............................. | 348/607 |
| 7,418,149 B2 * | 8/2008 | Dinh et al. | ............................. | 382/254 |
| 7,729,555 B2 * | 6/2010 | Chen et al. | ............................. | 382/261 |
| 7,916,187 B2 * | 3/2011 | Tsuruoka | ............................. | 348/241 |
| 8,023,761 B2 * | 9/2011 | Rhee | ............................. | 382/260 |
| 8,081,224 B2 * | 12/2011 | Lin | ............................. | 348/241 |

(Continued)

FOREIGN PATENT DOCUMENTS

JP   2000-209507 A   7/2000

(Continued)

OTHER PUBLICATIONS

International Search Report and Written Opinion dated Jan. 20, 2009 (in English translation) in counterpart International Application No. PCT/JP2008/072339.

*Primary Examiner* — John Villecco
(74) *Attorney, Agent, or Firm* — Holtz, Holtz, Goodman & Chick, PC (57) ABSTRACT

There is provided a moving image noise reduction processing apparatus for reducing noise in a digitalized time-series image signal, including: a spatial noise reduction unit applying spatial noise reduction processing to the image signal; a previous buffer unit storing an image signal to which at least the spatial noise reduction processing has been applied; and a temporal noise reduction unit performing temporal noise reduction processing based on an image signal to be processed to which the spatial noise reduction processing has been applied in the spatial noise reduction unit and an image signal which is stored in the previous buffer unit and is earlier than the image signal to be processed.

15 Claims, 9 Drawing Sheets

U.S. PATENT DOCUMENTS

| | | | |
|---|---|---|---|
| 8,135,234 B2 * | 3/2012 | Tourapis et al. | 382/275 |
| 2002/0028025 A1 * | 3/2002 | Hong | 382/260 |
| 2006/0066736 A1 | 3/2006 | Tsuruoka | |
| 2006/0158562 A1 * | 7/2006 | Rhee | 348/607 |
| 2007/0024748 A1 | 2/2007 | Kubota | |
| 2008/0152256 A1 * | 6/2008 | Ou et al. | 382/276 |
| 2010/0045870 A1 * | 2/2010 | Chao | 348/607 |
| 2011/0037900 A1 * | 2/2011 | Rhee | 348/607 |
| 2011/0235941 A1 * | 9/2011 | Hamada et al. | 382/275 |
| 2012/0033109 A1 * | 2/2012 | Tsuruoka | 348/242 |
| 2012/0081553 A1 * | 4/2012 | Cote et al. | 348/242 |
| 2012/0086838 A1 * | 4/2012 | Ovsiannikov | 348/242 |

FOREIGN PATENT DOCUMENTS

| | | |
|---|---|---|
| JP | 2001-157057 A | 6/2001 |
| JP | 2005-303802 A | 10/2005 |
| JP | 2006-101006 A | 4/2006 |
| JP | 2007-060636 A | 3/2007 |

* cited by examiner

MOVING IMAGE NOISE REDUCTION PROCESSING APPARATUS, COMPUTER-READABLE RECORDING MEDIUM ON WHICH MOVING IMAGE NOISE REDUCTION PROCESSING PROGRAM IS RECORDED, AND MOVING IMAGE NOISE REDUCTION PROCESSING METHOD

CROSS REFERENCE TO RELATED APPLICATION

This application is a continuation application of PCT/JP2008/072339 filed on Dec. 9, 2008 and claims benefit of Japanese Application No. 2007-325156 filed in Japan on Dec. 17, 2007, the entire contents of which are incorporate herein by this reference.

BACKGROUND OF THE INVENTION

1. Field of the Invention

The present invention relates to a moving image noise reduction processing apparatus, a computer-readable recording medium on which a moving image noise reduction processing program is recorded, and a moving image noise reduction processing method for reducing noise in a digitalized time-series image signal.

2. Description of the Related Art

An image pickup system includes components such as an image sensor and an analog circuit and an analog-to-digital converter associated with the image sensor. A video signal provided from the image pickup system typically contains noise components. The noise components can be broadly divided into two categories: fixed pattern noise and random noise.

The fixed pattern noise is noise, such as defective pixels, caused primarily by the image sensor.

The random noise, on the other hand, is generated in the image sensor and the analog circuit and has a characteristic similar to a white noise characteristic.

For the random noise, Japanese Patent Application Laid-Open Publication No. 2001-157057 discloses a technique in which statically given constant terms a, b and c and a signal level D converted to a concentration value are used to express an amount of noise N in function form, $N=ab^{cD}$, an amount of noise N related to the signal level D is estimated from the function, and a filtering frequency characteristic is controlled on the basis of the estimated amount of noise N. With this technique, noise reduction processing adaptive to the signal level is performed.

Japanese Patent Application Laid-Open Publication No. 2005-303802 describes a technique in which a noise model is simplified and the simplified model is used to calculate an amount of noise.

On the other hand, there is a processing technique for reducing random noise in moving images that uses correlation in a time axis direction to perform cyclic noise reduction processing.

For example, Japanese Patent Application Laid-Open Publication No. 2000-209507 describes such a technique in which a difference between an image signal of a current frame (or a current field; the following description will be provided with respect to only frames as representative of frames and fields) and an image signal of a previous frame is processed and, on the basis of a signal value resulting from the processing, a feedback factor in cyclic noise reduction processing is controlled. In broad terms, the feedback factor represents a rate of contribution of a previous frame to noise reduction processing of the image signal of the current frame. More specifically, if the signal value resulting from the difference processing is small, the signal is determined to be random noise, and the feedback factor is increased (the rate of contribution of the previous frame is increased) to obtain an image signal containing a reduced amount of noise. On the other hand, if the signal value resulting from the difference processing is large, the signal is determined to be a motion component and the feedback factor is reduced (the rate of contribution of the previous frame is reduced) to obtain an image signal containing a reduced amount of residual image. The technique has advantages that the amount of computation is small and costs can be kept low because control is performed based on a signal value resulting from the difference processing.

SUMMARY OF THE INVENTION

According to an aspect of the present invention, there is provided a moving image noise reduction processing apparatus for reducing noise in a digitalized time-series image signal, including: a spatial noise reduction unit applying spatial noise reduction processing to the image signal; an image signal storage unit storing an image signal to which at least the spatial noise reduction processing has been applied; and a temporal noise reduction unit performing temporal noise reduction processing based on an image signal to be processed to which the spatial noise reduction processing has been applied in the spatial noise reduction unit and an image signal which is stored in the image signal storage unit and is earlier than the image signal to be processed.

According to another aspect of the present invention, there is provided a computer-readable recording medium on which a moving image noise reduction processing program for reducing noise in a digitalized time-series image signal is recorded, the moving image noise reduction processing program causing the following steps to be performed: a spatial noise reduction step of applying spatial noise reduction processing to the image signal; an image signal storage step of storing an image signal to which at least the spatial noise reduction processing has been applied; and a temporal noise reduction step of performing temporal noise reduction processing based on an image signal to be processed to which the spatial noise reduction processing has been applied in the spatial noise reduction step and an image signal which is stored in the image signal storage step and is earlier than the image signal to be processed.

According to yet another aspect of the present invention, there is provided a moving image noise reduction processing method for reducing noise in a digitalized time-series image signal, including: a spatial noise reduction step of applying spatial noise reduction processing to the image signal; an image signal storage step of storing an image signal to which at least the spatial noise reduction processing has been applied; and a temporal noise reduction step of performing temporal noise reduction processing based on an image signal to be processed to which the spatial noise reduction processing has been applied in the spatial noise reduction step and an image signal which is stored in the image signal storage step and is earlier than the image signal to be processed.

DETAILED DESCRIPTION OF THE PREFERRED EMBODIMENTS

Embodiments of the present invention will be described with reference to drawings.

First Embodiment

Figure 1:
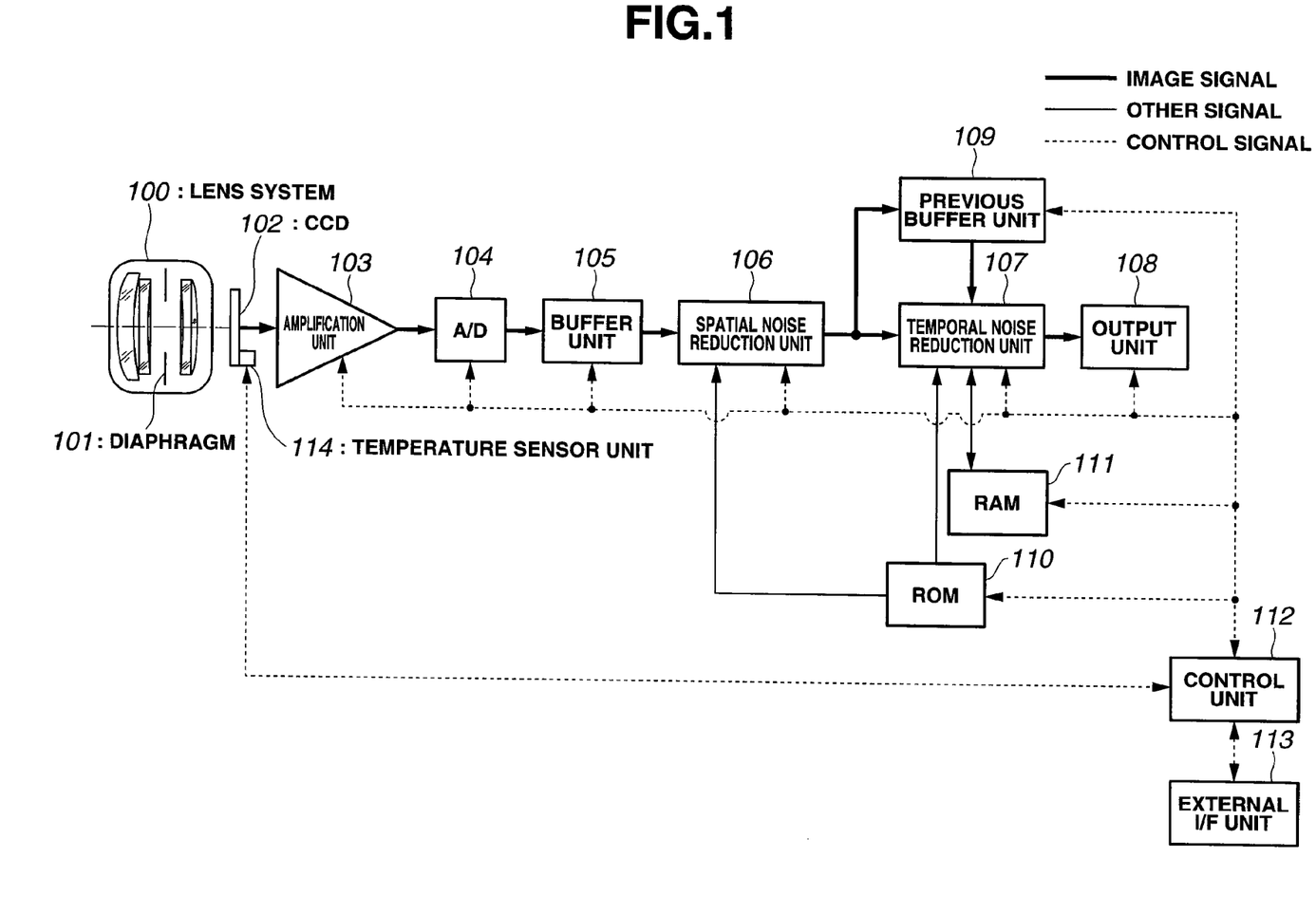
FIG. 1 is a block diagram illustrating a configuration of an image pickup apparatus to which a moving image noise reduction processing apparatus according to a first embodiment of the present invention is applied.
Figure 2:
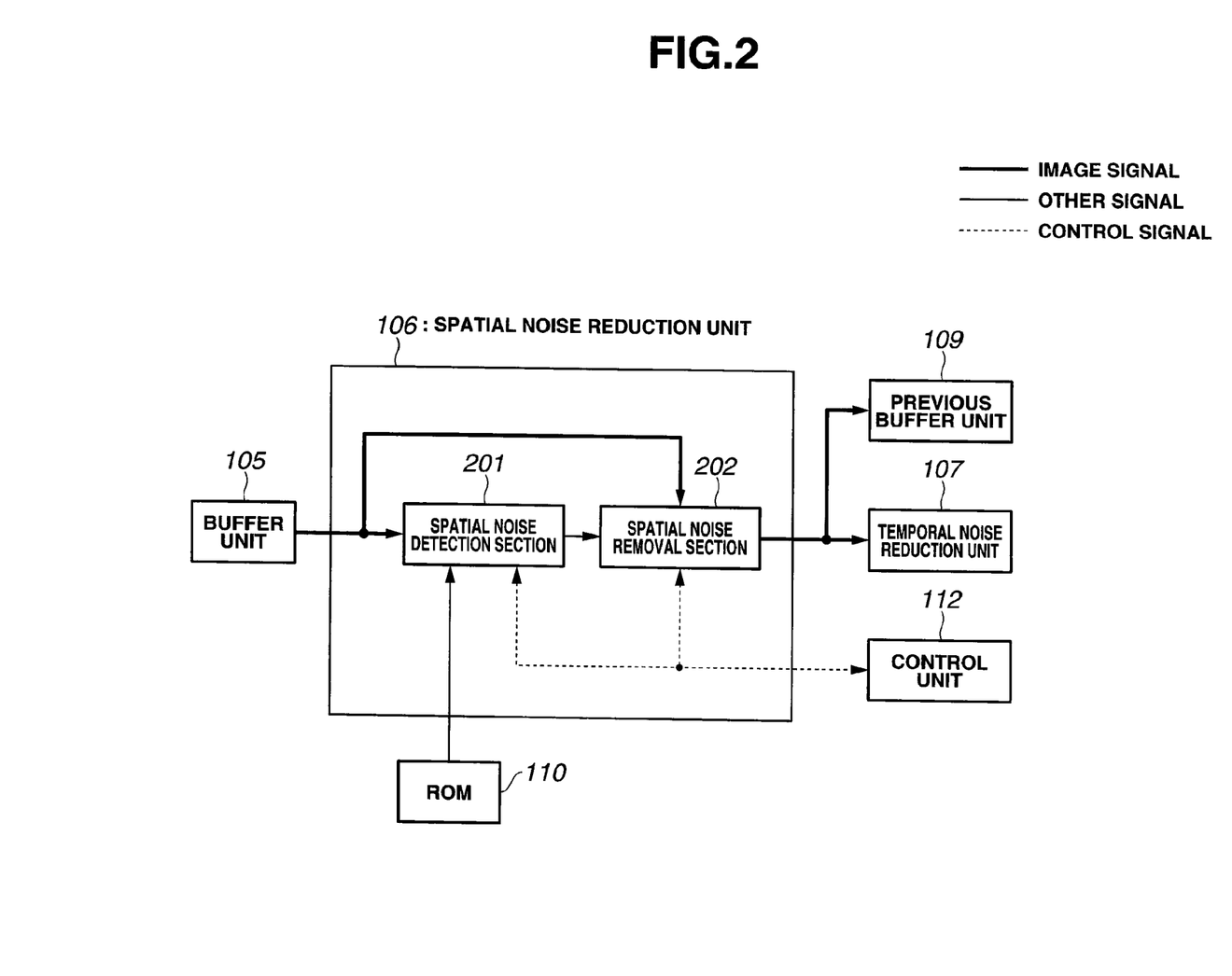
FIG. 2 is a block diagram illustrating a configuration of a spatial noise reduction unit in the first embodiment.
Figure 3:
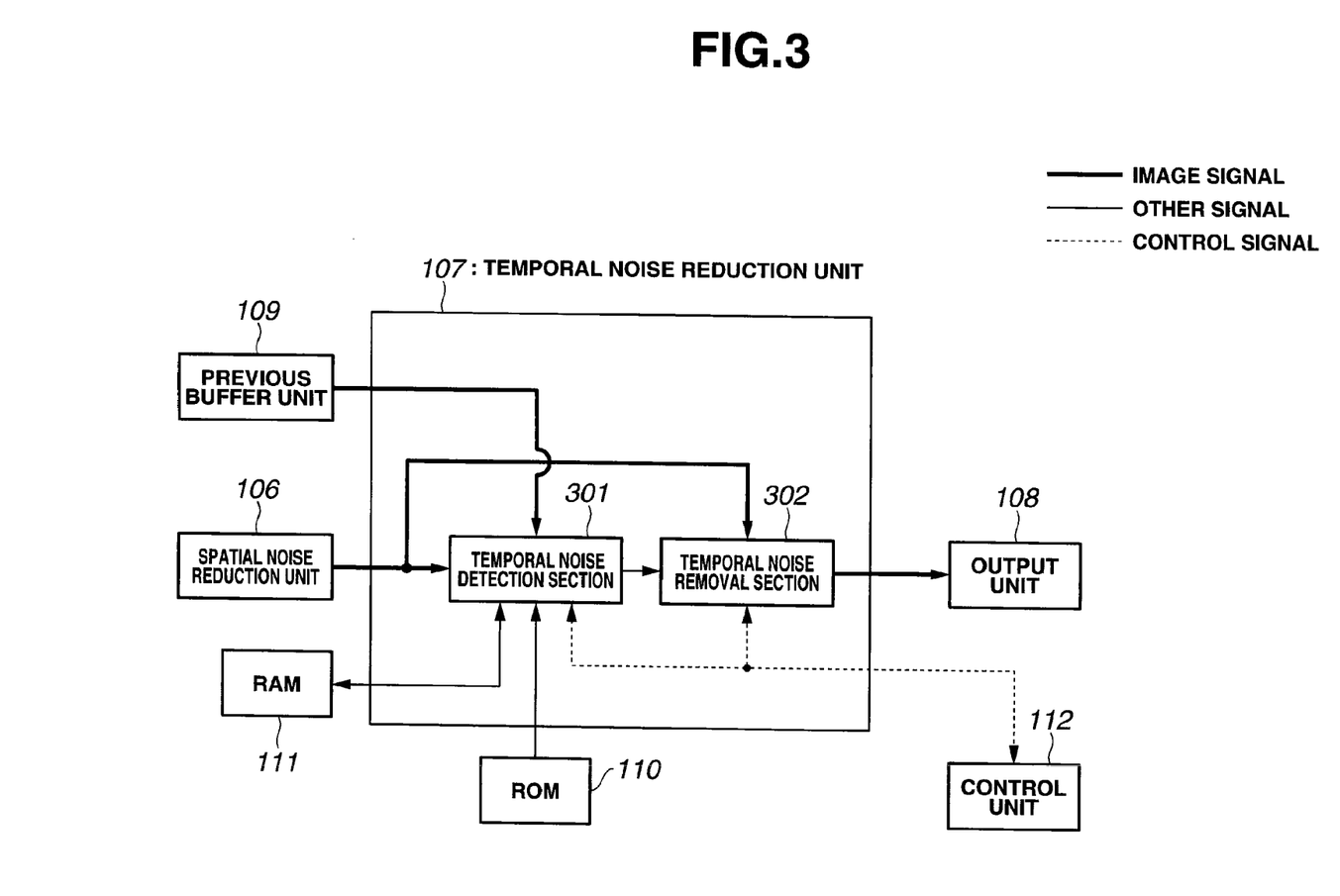
FIG. 3 is a block diagram illustrating a configuration of a temporal noise reduction unit in the first embodiment.
Figure 4:
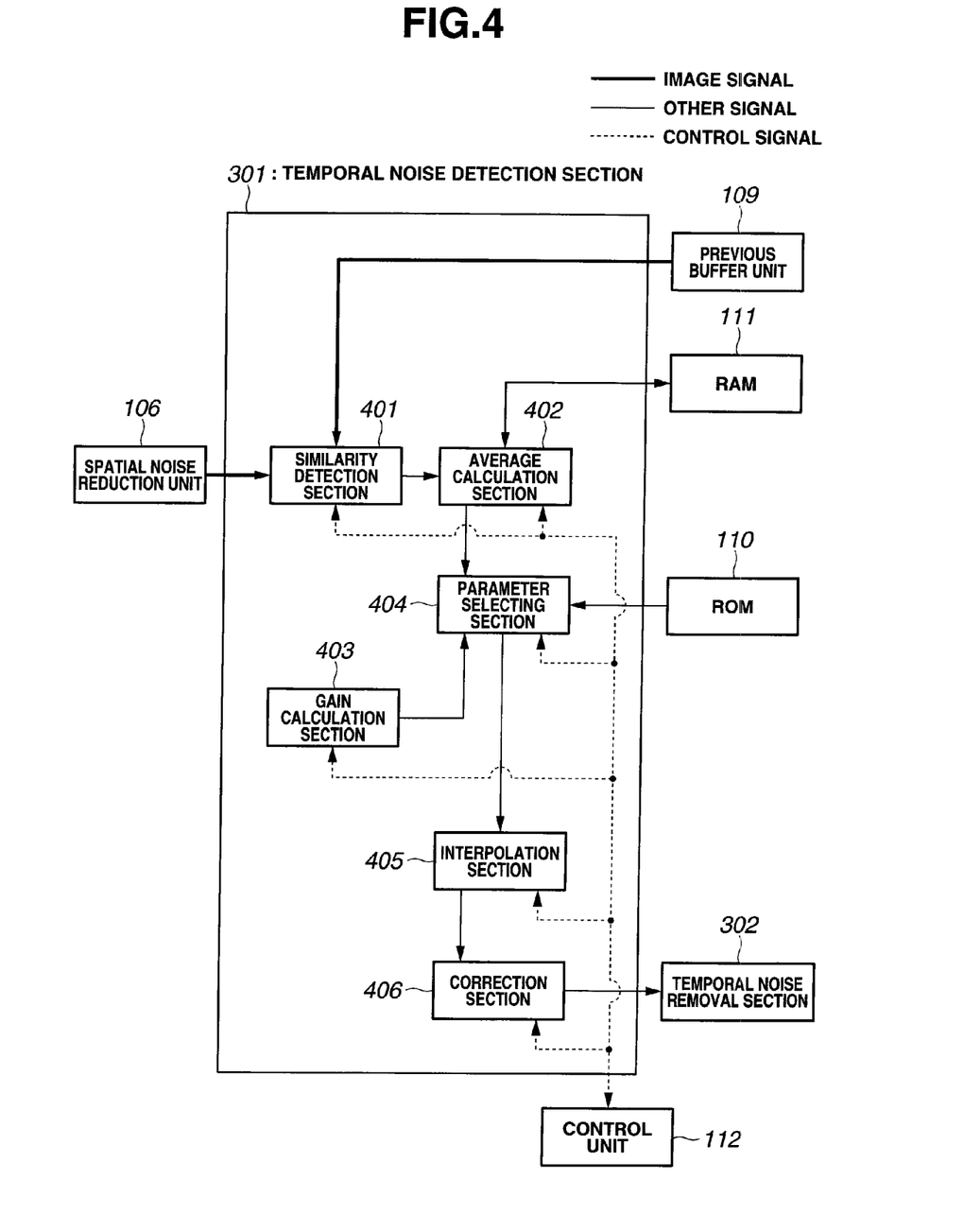
FIG. 4 is a block diagram illustrating a configuration of a temporal noise detection section in the first embodiment.
Figure 5:
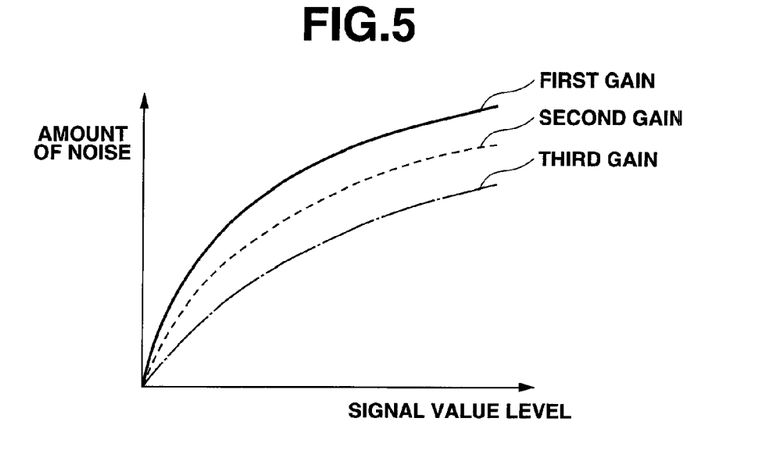
FIG. 5 is a graph of temporal noise amount versus signal value at multiple gains in the first embodiment.
Figure 6:
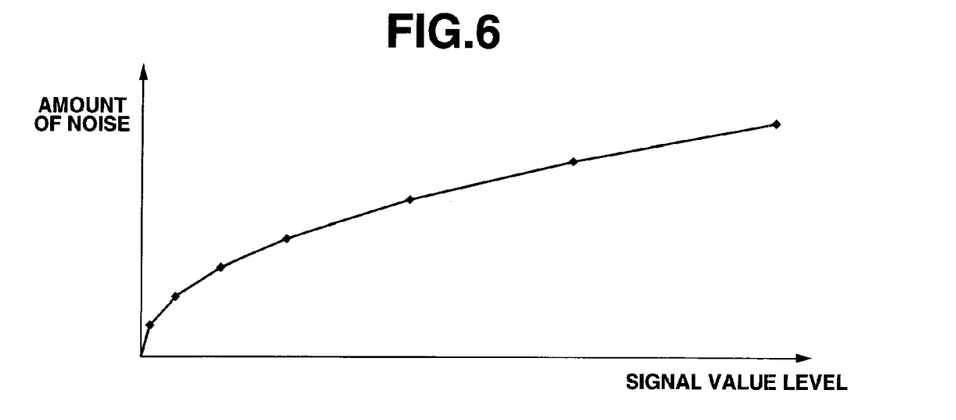
FIG. 6 is a graph illustrating a simplified noise model in the first embodiment.
Figure 7:
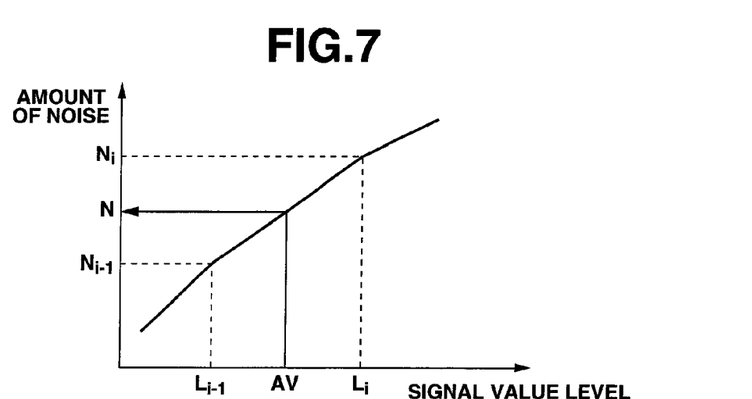
FIG. 7 is a graph illustrating an example in which interpolation processing based on the simplified noise model is performed to calculate the amount of noise.

FIGS. 1 to 7 illustrate a first embodiment of the present invention. FIG. 1 is a block diagram illustrating a configuration of an image pickup apparatus to which a moving image noise reduction processing apparatus is applied; FIG. 2 is a block diagram illustrating a configuration of a spatial noise reduction unit; FIG. 3 is a block diagram illustrating a configuration of a temporal noise reduction unit; FIG. 4 is a block diagram illustrating a configuration of a temporal noise detection section; FIG. 5 is a graph of temporal noise mount versus signal value at multiple gains; FIG. 6 is a graph illustrating a simplified noise model; and FIG. 7 is a graph illustrating an example in which interpolation processing based on the simplified noise model is performed to calculate an amount of noise.

The present embodiment relates to an image pickup apparatus to which a moving image noise reduction processing apparatus is applied.

As illustrated in FIG. 1, the image pickup apparatus includes a lens system 100, a diaphragm 101, a charge-coupled device (CCD) 102, an amplification unit 103, an analog-to-digital (A/D) conversion unit 104, a buffer unit 105, a spatial noise reduction unit 106, a temporal noise reduction unit 107, an output unit 108, a previous buffer unit 109, a ROM 110, a RAM 111, a control unit 112, an external interface (I/F) unit 113, and a temperature sensor unit 114.

The lens system 100 forms an optical image of a subject on an image pickup surface of the CCD 102.

The diaphragm 101 limits a range in which a light flux from the lens system 100 is allowed to pass, thereby controlling brightness of a subject optical image formed on the image pickup surface of the CCD 102.

The CCD 102 photoelectrically converts the formed subject optical image and outputs the subject optical image as an analog image signal. It is assumed here that the image signal outputted from the CCD 102 is a moving image signal obtained trough continuous shooting in time series.

The CCD 102 is connected to the output unit 108 through the amplification unit 103, the A/D conversion unit 104, the buffer unit 105, the spatial noise reduction unit 106, and the temporal noise reduction unit 107. The spatial noise reduction unit 106 is connected to the previous buffer unit 109. The previous buffer unit 109 is connected to the temporal noise reduction unit 107. The ROM 110 is connected to the spatial noise reduction unit 106 and the temporal noise reduction unit 107. The RAM 111 is bidirectionally connected to the temporal noise reduction unit 107. The control unit 112 is bidirectionally connected to the amplification unit 103, the A/D conversion unit 104, the buffer unit 105, the spatial noise reduction unit 106, the temporal noise reduction unit 107, the output unit 108, the previous buffer unit 109, the ROM 110, the RAM 111, the external I/F unit 113, and the temperature sensor unit 114 so as to control these components. The temperature sensor unit 114 is located near the CCD 102.

An operation of the image pickup apparatus having the configuration illustrated in FIG. 1 will be described below according to a flow of an image signal.

When a record button included in the external I/F unit 113 is pressed, optical images of a subject that is formed through the lens system 100 and the diaphragm 101 are sequentially subjected to photoelectric conversion by the CCD 102 at predetermined time intervals (it is assumed in the present embodiment that the predetermined time intervals are set to $1/30$ seconds) and are outputted as an analog moving image signal. It is assumed that known correlated-double sampling has been applied to the moving image signal. It is also assumed that the CCD 102 is a three-CCD including RGB primary color filters disposed in front of each CCD in the present embodiment. In the following description, multiple image signals (moving image signals) outputted in time series are simply referred to as an image signal and an image signal of one picture is referred to as one frame (while the following description is also applicable to fields instead of frames, frame and field will be hereinafter generally referred to as "frame").

The analog image signal is amplified by the amplification unit 103 by a predetermined gain and is then converted by the A/D conversion unit 104 to a digital signal, which is then transferred to the buffer unit 105 and stored in the buffer unit 105.

The buffer unit 105 has a storage capacity capable of storing an image signal of one frame. Accordingly, a frame image stored in the buffer unit 105 is overwritten by a next frame image as frame images are captured one after another.

The frame image signal stored in the buffer unit 105 is transferred to the spatial noise reduction unit 106 intermittently at predetermined frame time intervals (a frame rate) under the control of the control unit 112.

The spatial noise reduction unit 106 performs noise reduction processing in a spatial direction (spatial noise reduction processing) on the image signal of one frame transferred from the buffer unit 105 on the basis of a spatial noise model which is a noise model in a space domain. The spatial noise reduction unit 106 transfers the image signal to which the spatial noise reduction processing has been applied to the temporal noise reduction unit 107 and the previous buffer unit 109.

At the same time, the previous buffer unit 109, which is an image signal storage unit, performs processing for overwriting one or more frame image signals stored in sequence, under the control of the control unit 112. Specifically, the previous buffer unit 109 has a storage capacity capable of storing a predetermined number of frame images. Image signals of the predetermined number of previous frames to which spatial noise reduction processing has been applied are stored in the previous buffer unit 109. The previous buffer unit 109 performs processing for overwriting an oldest image signal among the predetermined number of previous frame image signals stored with a new image signal.

The temporal noise reduction unit 107 uses one or more previous frame image signals stored in the previous buffer unit 109 to apply noise reduction processing in a temporal direction (temporal noise reduction processing) to an image signal of one frame transferred from the spatial noise reduction unit 106. The temporal noise reduction unit 107 transfers the image signal to which the temporal noise reduction processing has been applied to the output unit 108 under the control of the control unit 112.

The output unit 108 displays an image signal transferred to the output unit 108 on a display apparatus such as a monitor or records and stores the image signal in a recording medium such as a magnetic disk or a memory card.

An exemplary configuration of the spatial noise reduction unit 106 will be described below with reference to FIG. 2.

The spatial noise reduction unit 106 includes a spatial noise detection section 201, which is a spatial noise amount detection unit, and a spatial noise removal section 202, which is a spatial noise removal processing unit.

The buffer unit 105 is connected to the temporal noise reduction unit 107 through the spatial noise detection section 201 and the spatial noise removal section 202. The buffer unit 105 is also connected to the spatial noise removal section 202. The spatial noise removal section 202 is also connected to the previous buffer unit 109. The ROM 110 is connected to the spatial noise detection section 201. The control unit 112 is bidirectionally connected to the spatial noise detection section 201 and the spatial noise removal section 202 so as to control these components.

The spatial noise reduction unit 106 calculates an amount of noise. The calculation of the amount of noise may be performed by using any of various methods. The present embodiment will be described with respect to an example in which a known noise amount calculation method described in Japanese Patent Application Laid-Open Publication No. 2005-303802 is used to calculate the amount of noise.

Specifically, first the spatial noise detection section 201 uses information such as temperature of the CCD 102 at the time when an image signal has been captured and a gain indicating an amplification factor of the amplification unit 103 to retrieve a noise model associated with the information from the ROM 110 under the control of the control unit 112. The spatial noise detection section 201 then detects the amount of noise (spatial noise amount) in a spatial direction in each pixel on the basis of the retrieved noise model and an image signal value from the buffer unit 105 and transfers the detected spatial noise amount to the spatial noise removal section 202.

The spatial noise removal section 202 performs spatial noise removal processing based on the spatial noise amount information for each pixel from the spatial noise detection section 201 and the image signal value from the buffer unit 105 under the control of the control unit 112. The spatial noise removal section 202 then transfers the image signal in which spatial noise has been reduced to the temporal noise reduction unit 107 and the previous buffer unit 109. It is assumed that the spatial noise reduction processing is performed for each of color signals (RGB) in the present embodiment.

Referring to FIG. 3, an exemplary configuration of the temporal noise reduction unit 107 will be described below.

The temporal noise reduction unit 107 includes a temporal noise detection section 301, which is a temporal noise amount detection unit, and a temporal noise removal section 302, which is a temporal noise removal processing unit.

The spatial noise reduction unit 106 is connected to the output unit 108 through the temporal noise detection section 301 and the temporal noise removal section 302. The spatial noise reduction unit 106 is also connected to the temporal noise removal section 302. The previous buffer unit 109 is connected to the temporal noise detection section 301. The ROM 110 is connected to the temporal noise detection section 301. The RAM 111 is bidirectionally connected to the temporal noise detection section 301. The control unit 112 is bidirectionally connected to the temporal noise detection section 301 and the temporal noise removal section 302 so as to control these components.

The temporal noise detection section 301 detects the degree of similarity between an image signal transferred pixel by pixel from the spatial noise reduction unit 106 and one or more previous image signals stored in the previous buffer unit 109 to which the spatial noise reduction processing has been applied (the previous buffer unit 109 in the present embodiment is configured to store previous image signals of eight frames) and estimates the amount of temporal noise on the basis of the detected degree of similarity under the control of the control unit 112. The temporal noise detection section 301 then transfers the estimated temporal noise amount to the temporal noise removal section 302.

The temporal noise removal section 302 performs temporal noise removal processing based on temporal noise amount transferred from the temporal noise detection section 301 and the image signal from the spatial noise reduction unit 106 under the control of the control unit 112. The temporal noise removal section 302 transfers the image signal to which the temporal noise removal processing has been applied to the output unit 108.

Referring to FIG. 4, an exemplary configuration of the temporal noise detection section 301 will be described below.

The temporal noise detection section 301 includes a similarity detection section 401, which is a representative value estimation unit, an average calculation section 402, which is a representative value estimation unit and is also an average value calculation unit, a gain calculation section 403, which is a temporal noise amount calculation unit, a parameter selecting section 404, which is the temporal noise amount calculation unit, an interpolation section 405, which is the temporal noise amount calculation unit, and a correction section 406, which is the temporal noise amount calculation unit.

The spatial noise reduction unit 106 is connected to the temporal noise removal section 302 through the similarity detection section 401, the average calculation section 402, the parameter selecting section 404, the interpolation section 405, and the correction section 406. The previous buffer unit 109 is connected to the similarity detection section 401. The RAM 111 is bidirectionally connected to the average calculation section 402. The gain calculation section 403 and the ROM 110 are connected to the parameter selecting section 404. The control unit 112 is bidirectionally connected to the similarity detection section 401, the average calculation section 402, the gain calculation section 403, the parameter selecting section 404, the interpolation section 405, and the correction section 406 so as to control these components.

The similarity detection section 401 determines, pixel by pixel, the degree of similarity between an image signal from the spatial noise reduction unit 106 and one or more previous spatial-noise-reduced image signals from the previous buffer unit 109 under the control of the control unit 112. Here, in order to make determination of the degree of similarity in isolation from motion components, the similarity detection section 401 determines that a pixel of interest has a high similarity if a difference value between the signal value of the pixel of interest and the signal value of a pixel in the same location in a previous frame as the pixel of interest is smaller than or equal to a threshold value (Th). The similarity detection section 401 then transfers a pixel signal value in the previous frame that corresponds to the pixel of interest and has a high similarity to the pixel of interest to the average calculation section 402. On the other hand, if differences between the pixel of interest and pixels in the same pixel location in all previous frames as the pixel of interest are greater than the threshold value (Th), the similarity detection section 401 determines that there is not a similar pixel and transfers information indicating that there is not a similar pixel to the average calculation section 402.

The threshold value (Th) described above can be set as appropriate and is not limited to a fixed value. The threshold value (Th) may be dynamically set. For example, a signal value of a pixel of interest in a current image may be used to estimate the amount of noise $N_i$ on the basis of a temporal noise model, which is a noise model in a time domain, which will be described later, and the estimated noise amount $N_i$ may be used as the threshold value (Th).

The average calculation section 402, under the control of the control unit 112, uses similarity information from the similarity detection section 401 to calculate an average value Color_av between the signal value of the pixel of interest and the signal value of the pixel in the same location as the pixel of interest in the previous frame that has been determined to have a high degree of similarity to the pixel of interest. If information indicating that a pixel that is similar to the pixel of interest has not been found in any of the previous frame images is transferred from the similarity detection section 401, the average calculation section 402 provides the signal value of the pixel of interest as the average value.

On the other hand, the control unit 112 obtains information indicating the temperature of the CCD 102 from the temperature sensor unit 114 and stores the information in the RAM 111. Thus, temperature information at the time when a previous frame image signal stored in the previous buffer unit 109 has been captured is stored in the RAM 111.

The average calculation section 402 retrieves temperature information associated with a previous frame image stored in the previous buffer unit 109 from the RAM 111 and calculates an average temperature T_av on the basis of the retrieved temperature information and temperature information associated with the current frame image under the control of the control unit 112. The average calculation section 402 then transfers the information indicating the average temperature T_av and the average value Color_av of each pixel of interest to the parameter selecting section 404 under the control of the control unit 112. The information indicating the average value Color_av of each pixel of interest is also transferred to the temporal noise removal section 302 through the parameter selecting section 404, the interpolation section 405 and the correction section 406 under the control of the control unit 112.

The parameter selecting section 404 sets a signal value AV based on the average value Color_av of a pixel of interest provided from the average calculation section 402, a temperature t based on the average temperature T_av provided from the average calculation section 402, and a gain g based on gain information provided from the gain calculation section 403 and estimates the amount of temporal noise as will be described below. The gain calculation section 403 calculates the gain information on the basis of a gain at the amplification unit 103 obtained through the control unit 112 under the control of the control unit 112.

FIG. 5 is a plot of signal value V versus temporal noise amount N at a temperature t for three kinds of gains. As can be seen from FIG. 5, the temporal noise amount N tends to increase in a quadratic curve with increasing signal value V. Therefore, the amount of temporal noise illustrated in FIG. 5 can be modeled (temporal noise modeling) by a following quadratic function as illustrated as Equation 1:

$$N = A \times V^2 + B \times V + C \qquad [\text{Equation 1}]$$

where A, B and C are constants dependent on temperature t and gain.

Recording multiple equations 1 for different temperatures t and gains for calculation of noise amounts would increase the amount of data recorded and would be troublesome. Therefore, known simplification of noise models described in Japanese Patent Application Laid-Open Publication No. 2005-303802 described above is performed in the present embodiment.

Specifically, first a model that provides a maximum amount of noise is set as a reference model. The reference noise model is approximated by a line segment with a predetermined number of representative points (eight representative points including the origin in the example in FIG. 6) as illustrated in FIG. 6 (to further simplify, or to approximate only a particular range, the model may be approximated by a straight line.). Then, coordinates of the representative points (each set of coordinates is made up of a signal value level and a noise amount) are stored in the ROM 110. Slope between adjacent representative points (there are seven slopes if the number of representative points is eight) can be calculated from the coordinates of the representative points. In order to simplify the computation processing, the slopes are calculated and stored in the ROM 110 beforehand.

Specifically, signal value levels "Level" (see Equation 2) and noise amounts "Noise" (see Equation 3) of representative points, and slopes "Slope" (see Equation 4) between adjacent representative points are stored in the ROM 110 in the present embodiment.

$$\text{Noise}[8] = \{N_1, N_2, N_3, N_4, N_5, N_6, N_7, N_8\} \qquad [\text{Equation 2}]$$

$$\text{Level}[8] = \{L_1, L_2, L_3, L_4, L_5, L_6, L_7, L_8\} \qquad [\text{Equation 3}]$$

$$\text{Slope}[7] = \{S_1, S_2, S_3, S_4, S_5, S_6, S_7\} \qquad [\text{Equation 4}]$$

A reference noise amount based on the reference noise model is calculated as follows. First, the interval of the reference noise model to which a signal value AV belongs is located. For example, suppose that a signal value AV belongs to the interval between $L_{i-1}$ and $L_i$ as illustrated in FIG. 7. Then the parameter selecting section 404 finds information indicating the interval to which the signal value AV belongs from the ROM 101 and transfers the information to the interpolation section 405 under the control of the control unit 112. Then the interpolation section 405 performs linear interpolation on the found interval ($L_{i-1}$, $L_i$) under the control of the control unit 112 as follows to calculate a reference temporal noise amount $N_g$.

$$N_g = S_{i-1} \times (AV - L_{i-1}) + N_{i-1} \qquad [\text{Equation 4}]$$

Correction coefficients $K_{tgc}$ for correcting calculated reference temporal noise amounts $N_g$ in accordance with combinations of temperature t, gain g and color signal c are also stored in the ROM 110. Correction coefficients $k_{tgc}$ at a temperature t in an example in which there are four gains (g=1, . . . , 4) and three color signals R, G, B (c=r, g, b) are illustrated in Equation 5.

$$K_t[4][3] = \{K_{t1r}, K_{t1g}, K_{t1b}, K_{t2r}, K_{t2g}, K_{t2b}, K_{t3r}, K_{t3g},$$
$$K_{t3b}, K_{t4r}, K_{t4g}, K_{t4b}\} \quad \text{[Equation 5]}$$

Such a correction coefficient $K_{tgc}$ is calculated by a least-square method based on each noise model and the reference noise model. The parameter selecting section 404 retrieves a correction coefficient $K_{tgc}$ associated with a temperature t, a gain g, and a color signal c from the ROM 110 and transfers $K_{tgc}$ to the correction section 406 through the interpolation section 405. The correction section 406 then multiplies the reference temporal noise amount $N_g$ of the color signal c calculated by the interpolation section 405 on the basis of the reference noise model by the correction coefficient $K_{tgc}$ as illustrated in Equation 6 to obtain the temporal noise amount N of the color signal c at the temperature t and the gain g under the control of the control unit 112.

$$N = K_{tgc} \times N_g \quad \text{[Equation 6]}$$

The temporal noise amount N thus calculated by the correction section 406 is transferred to the temporal noise removal section 302.

Since in the present embodiment, the temporal noise amount is obtained on the basis of the reference noise model as has been described above, the calculation process is simplified so that processing speed can be increased and power consumption can be reduced.

The temporal noise removal section 302 performs temporal noise removal processing based on an image signal of a current frame from the spatial noise reduction unit 106, a temporal noise amount N from the temporal noise detection section 301, and an average value Color_av of a pixel of interest under the control of the control unit 112, as described below.

The temporal noise removal section 302 performs temporal noise reduction processing on a signal value C of the pixel of interest by using the temporal noise amount N and the average value Color_av of the pixel of interest to perform coring as illustrated by Equation 7, for example.

$$C' = C - N/2 \text{ (when } C > Color\_av + N/2)$$

$$C' = Color\_av \text{ (when } Color\_av + N/2 \geq C \geq Color\_av - N/2)$$

$$C' = C + N/2 \text{ (when } C < Color\_av - N/2) \quad \text{[Equation 7]}$$

The image signal C' to which the noise reduction processing has been applied by the temporal noise removal section 302 is transferred to the output unit 108 under the control of the control unit 112.

While image signals of eight previous frames are used to estimate the temporal noise amount in the foregoing, the number of previous frames used is not limited to eight. Image signals of six or four previous frames may be used to estimate the temporal noise amount. Such reduction of the number of previous frames used can decrease the precision of the temporal noise estimation but has the advantage of increasing processing speed.

While the average value Color_av (signal value AV) is obtained and the temporal noise amount is estimated by referring to a temporal noise model on the basis of the average value in the forgoing, the present embodiment is not limited thereto. The temporal noise amount may be estimated by referring to a temporal noise model on the basis of the pixel value itself of the pixel of interest in the current frame. This can somewhat decrease the precision of the temporal noise estimation but has the advantages that the need for referring to a previous image signal and therefore the need for storing a previous image signal is eliminated so that faster processing is accomplished at low cost.

While items of information such as the temperature of the CCD 102 at the time when an image signal is captured and the gain of the amplification unit 103 are used for calculating the temporal noise amount in the foregoing, information that can be used is not limited to those items of information. For example, information indicating the frame rate of a moving image may be used. Since the frame rate is indicative of the time interval between frames, the frame rate functions as an indication of correlation between the frames. Specifically, when images of the same subject is picked up in a moving image shooting mode, the correlation between frames that are adjacent to each other in terms of time will be high when the time interval between the frames is short whereas the correlation between frames that are adjacent to each other in terms of time will be low when the time interval between the frames is long. Therefore, when the time interval between frames is short, the number of previous image signal frames used for calculation of the amount of temporal noise may be reduced whereas when the time interval between frames is long, the number of previous image signal frames used for calculation of the amount of temporal noise may be increased. To give a specific example, when the frame rate is 1/30 seconds, eight previous image signal frames may be used whereas when the frame rate is 1/60 seconds, four previous image signal frames may be used. In addition, other kind of information may also be used to calculate the amount of temporal noise.

According to the first embodiment described above, random noise in the same frame can be reduced quantitatively with a high precision because the spatial noise reduction processing is first applied to a frame image on the basis of a spatial noise model.

Furthermore, since the temporal noise reduction processing based on a temporal noise model is applied to the image signal in which spatial noise has been reduced, residual noise remaining after the spatial noise reduction processing can be reduced with a high precision.

By performing the spatial noise reduction processing and the temporal noise reduction processing in this way, high-quality image signals can be provided.

Furthermore, the amount of noise caused by dynamic changes such as changes in a signal value level, temperature, and gain can be estimated on a color-signal-by-color-signal basis corresponding to color image sensors. Since noise reduction processing is performed for each of temperature, gain, and color signals on the basis of the amounts of noise thus estimated, the noise reduction processing can be performed with a high precision.

Additionally, load on hardware can be reduced since a reference noise model is approximated by line segments (or a straight line) and the amounts of noise for other models (such as models for specific temperatures, gains, and color signals) are derived from a reference noise amount obtained with reference to the reference noise model. Thus, according to the present embodiment, noise reduction processing adaptive to color image sensors can be performed while reducing load on hardware and ensuring a high precision.

Second Embodiment

Figure 8:
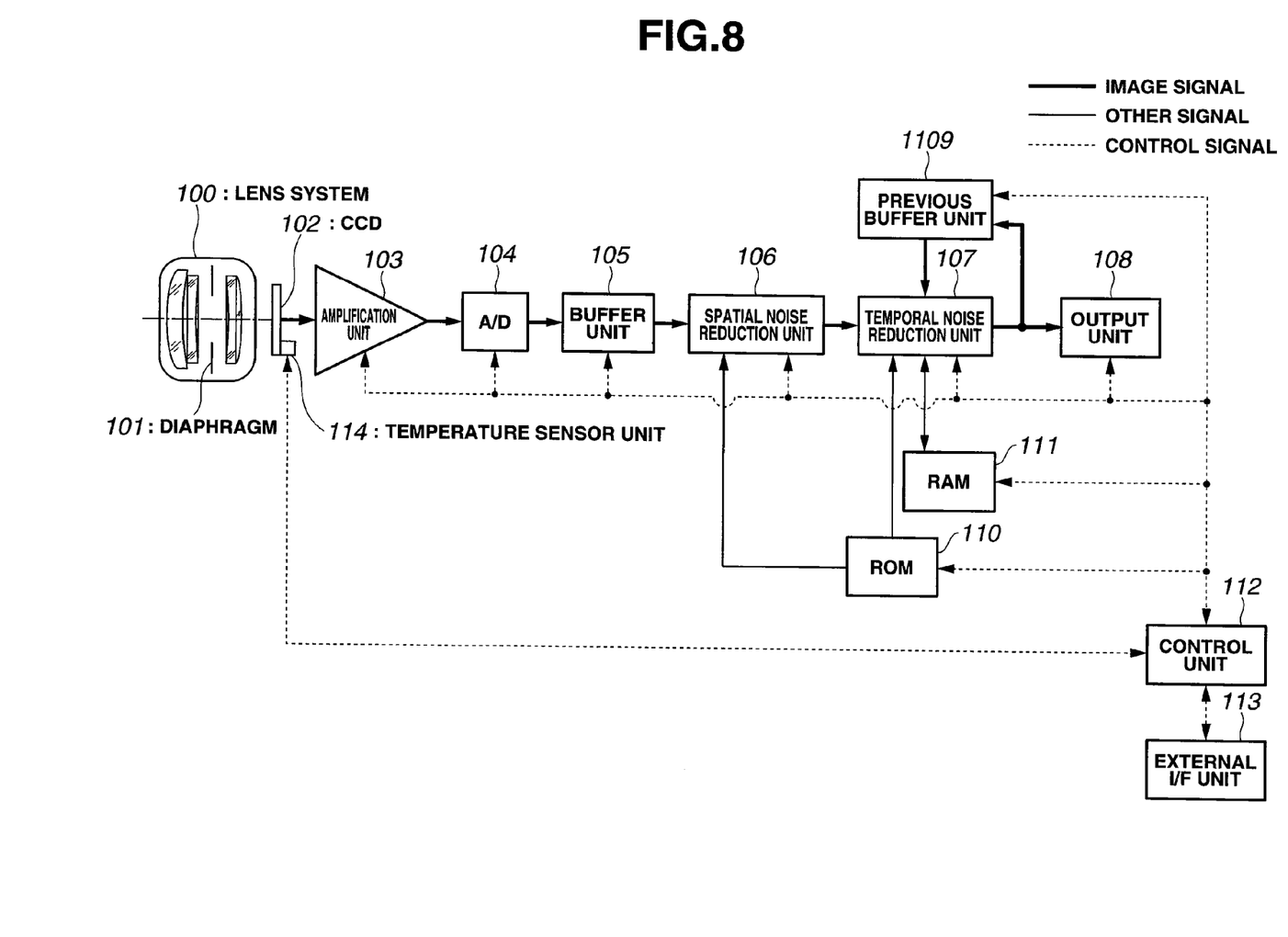
FIG. 8 is a block diagram illustrating a configuration of an image pickup apparatus to which a moving image noise reduction processing apparatus according to a second embodiment of the present invention is applied.
Figure 9:
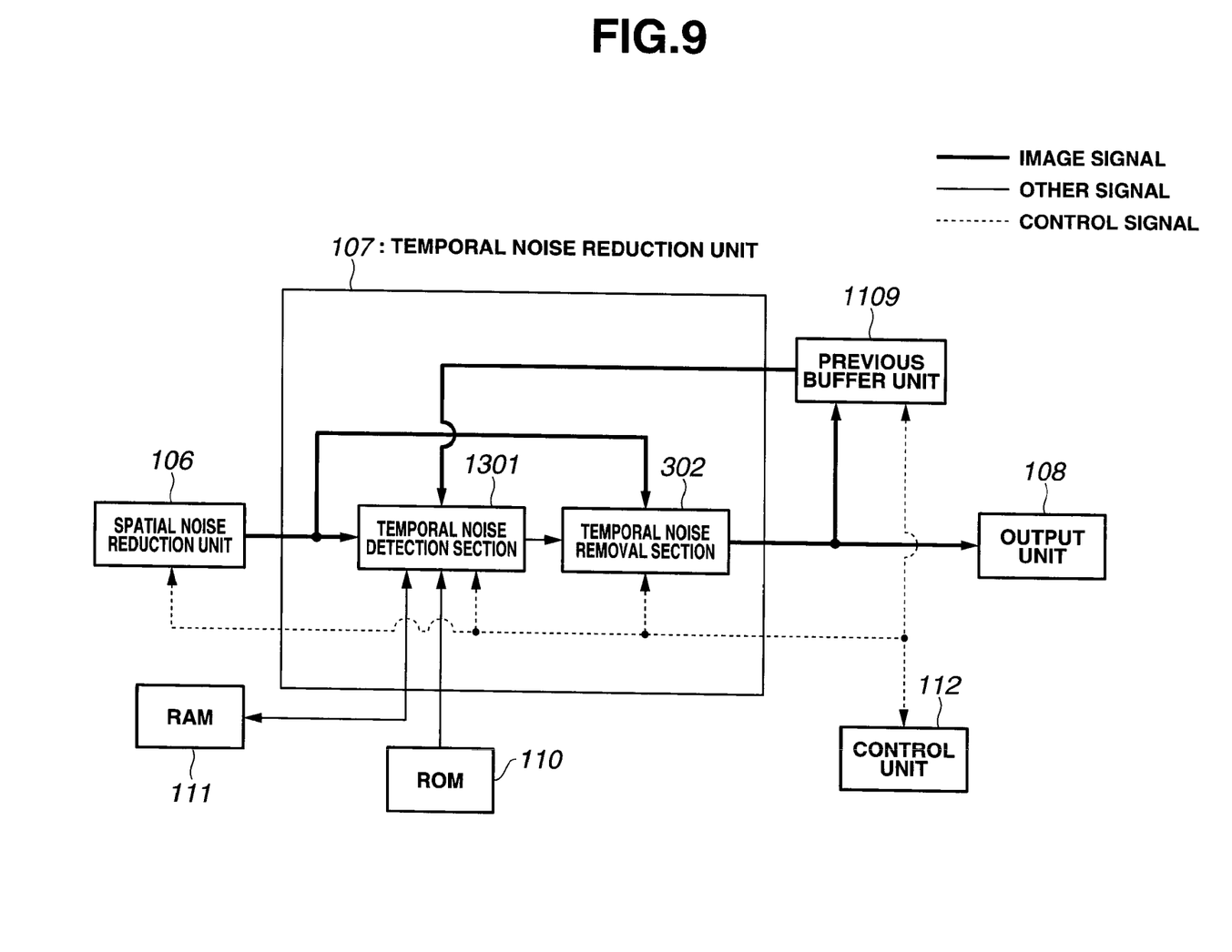
FIG. 9 is a block diagram illustrating a configuration of a temporal noise reduction unit in the second embodiment.
Figure 10:
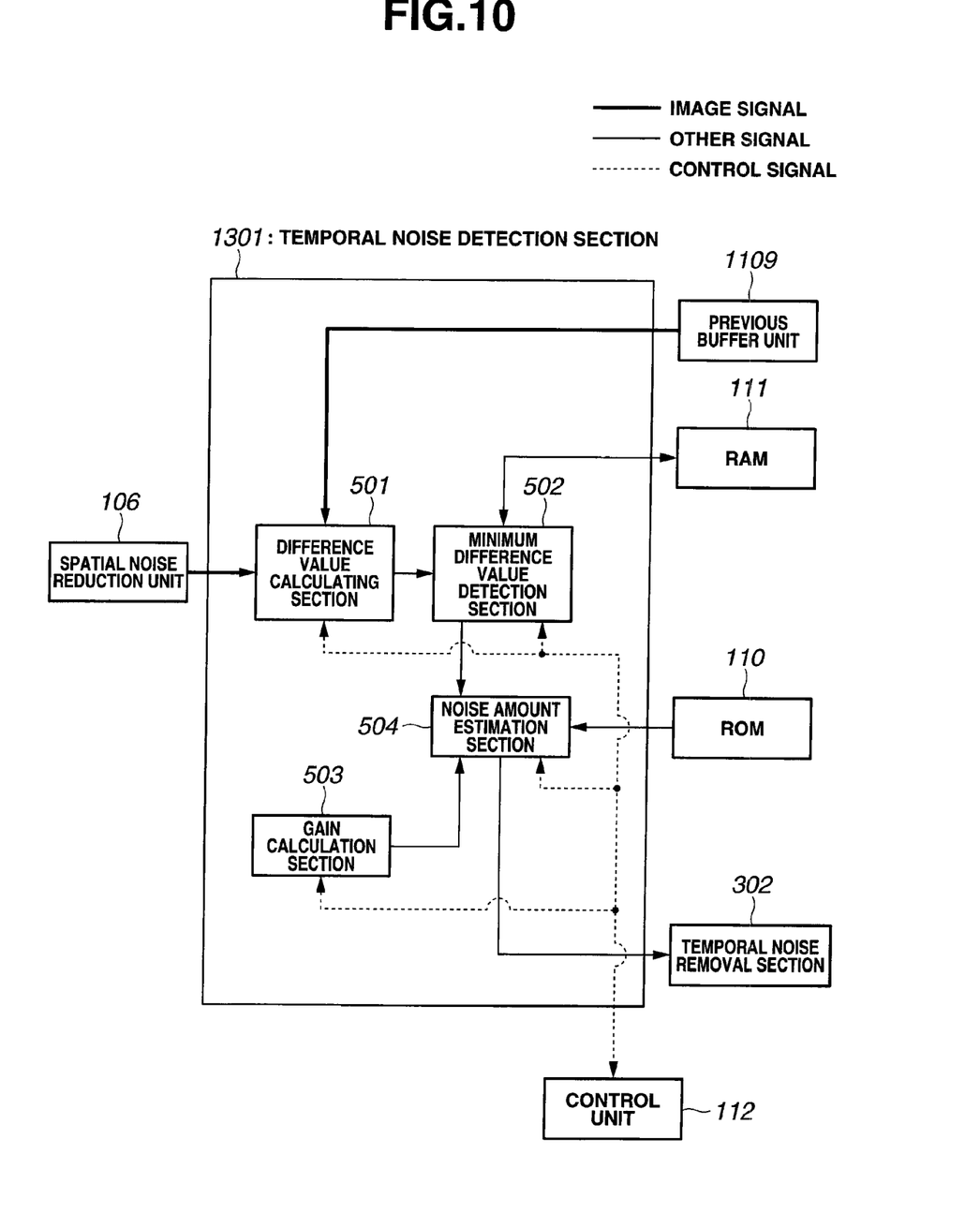
FIG. 10 is a block diagram illustrating a configuration of a temporal noise detection section in the second embodiment.
Figure 11:
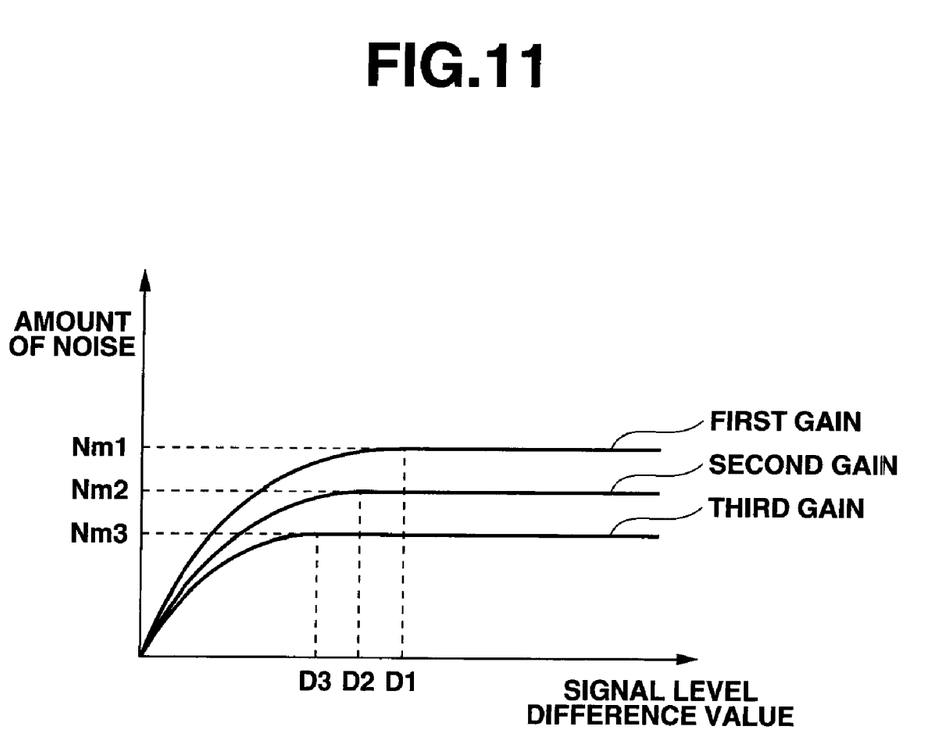
FIG. 11 is a graph of temporal noise amount versus minimum difference value of a signal value at multiple gains in the second embodiment.

FIGS. 8 to 11 illustrate a second embodiment of the present invention. FIG. 8 is a block diagram illustrating a configuration of an image pickup apparatus to which a moving image noise reduction processing apparatus is applied; FIG. 9 is a block diagram illustrating a configuration of a temporal noise reduction unit; FIG. 10 is a block diagram illustrating a configuration of a temporal noise detection section; and FIG. 11 is a graph of temporal noise amount versus minimum difference value of signal values at multiple gains.

In the second embodiment, the same elements as those in the first embodiment will be given the same reference numerals and description of the same elements will be omitted. Only differences from the first embodiment will be described specifically.

As in the first embodiment, a moving image noise reduction processing apparatus is applied to an image pickup apparatus in the second embodiment.

As illustrated in FIG. 8, the image pickup apparatus has a configuration substantially the same as the image pickup apparatus of the first embodiment illustrated in FIG. 1 except that the previous buffer unit 109 in the first embodiment is replaced with a different previous buffer unit 1109 and the internal configuration of the temporal noise reduction unit 107 is somewhat different from that in the first embodiment.

In the configuration, an output of a spatial noise reduction unit 106 is not connected to the previous buffer unit 1109 but instead an output of the temporal noise reduction unit 107 is connected to the previous buffer unit 1109. An output of the previous buffer unit 1109 is connected to the temporal noise reduction unit 107. A control unit 112 is bidirectionally connected to the previous buffer unit 1109 so as to control the previous buffer unit 1109.

The following description of an operation of the image sensor having the configuration illustrated in FIG. 8 will focus on differences from the first embodiment described above.

The spatial noise reduction unit 106 transfers an image signal of one frame to which spatial noise reduction processing has been applied to the temporal noise reduction unit 107.

The temporal noise reduction unit 107 separates a random noise component from a motion component of an image signal of one frame transferred from the spatial noise reduction unit 106 and the performs processing for reducing the separated random noise in a temporal direction by using one or more previous frame image signals which have been subjected to spatial noise reduction processing and temporal noise reduction processing and stored in the previous buffer unit 1109, which is an image signal storage unit. The temporal noise reduction unit 107 transfers the image signal resulting from the temporal noise reduction processing to an output unit 108 and the previous buffer unit 1109 under the control of a control unit 112.

At the same time, the previous buffer unit 1109 overwrites one or more frame image signals stored in sequence under the control of the control unit 112. Specifically, the previous buffer unit 1109 has a storage capacity capable of storing a predetermined number of frame images. A predetermined number of previous frame image signals to which the spatial noise reduction processing and the temporal noise reduction processing have been applied are stored in the previous buffer unit 1109. The previous buffer unit 1109 performs processing to overwrite an oldest image signal among the predetermined number of previous frame image signals held with a new image signal.

Referring to FIG. 9, an exemplary configuration of the temporal noise reduction unit 107 will be described below.

The temporal noise reduction unit 107 includes a temporal noise detection section 1301, which is a temporal noise amount detection unit, and a temporal noise removal section 302, which is a temporal noise removal processing unit.

The spatial noise reduction unit 106 is connected to the output unit 108 and the previous buffer unit 1109 through the temporal noise detection section 1301 and the temporal noise removal section 302. The spatial noise reduction unit 106 is also connected to the temporal noise removal section 302. The previous buffer unit 1109 is connected to the temporal noise detection section 1301. A ROM 110 is connected to the temporal noise detection section 1301. A RAM 111 is bidirectionally connected to the temporal noise detection section 1301. The control unit 112 is bidirectionally connected to the temporal noise detection section 1301 and the temporal noise removal section 302 so as to control them.

The temporal noise detection section 1301 calculates a difference between an image signal of one frame transferred from the spatial noise reduction unit 106 pixel by pixel and one or more previous frame image signals which have been subjected to the spatial noise reduction processing and the temporal noise reduction processing and stored in the previous buffer unit 1109 and estimate a temporal noise amount on the basis of the calculated difference under the control of the control unit 112. The temporal noise detection section 1301 then transfers the estimated temporal noise amount to the temporal noise removal section 302.

The temporal noise removal section 302 performs temporal noise reduction processing based on the amount of temporal noise from the temporal noise detection section 1301 and an image signal from the spatial noise reduction unit 106 under the control of the control unit 112. The temporal noise removal section 302 transfers the image signal to which the temporal noise removal processing has been applied to the output unit 108 and the previous buffer unit 1109.

Referring to FIG. 10, an exemplary configuration of the temporal noise detection section 1301 will be described below.

The temporal noise detection section 1301 includes a difference value calculation section 501, which is a difference value calculation unit, a minimum difference value detection section 502, a gain calculation section 503, and a noise amount estimation section 504.

The spatial noise reduction unit 106 is connected to the temporal noise removal section 302 through the difference value calculation section 501, the minimum difference value detection section 502, and the noise amount estimation section 504. The previous buffer unit 1109 is connected to the difference value calculation section 501. The RAM 111 is bidirectionally connected to the minimum difference value detection section 502. The gain calculation section 503 and the ROM 110 are connected to the noise amount estimation section 504. The control unit 112 is bidirectionally connected to the difference value calculation section 501, the minimum difference value detection section 502, the gain calculation section 503, and the noise amount estimation section 504 so as to control them.

The difference value calculation section 501 uses one or more previous image signals from the previous buffer unit 1109 that have been subjected to the spatial noise reduction processing and the temporal noise reduction processing to calculate a difference value D of each pixel of an image signal from the spatial noise reduction unit 106 that has been subjected to the spatial noise reduction processing, under the control of the control unit 112. The difference value calculation section 501 transfers the calculated difference value D to the minimum difference value detection section 502.

The minimum difference value detection section 502 obtains, for each pixel, a minimum difference value $D_{min}$ among one or more difference values D provided from the difference value calculation section 501 under the control of the control unit 112. The minimum difference value detection section 502 transfers the obtained minimum difference value $D_{min}$ to the noise amount estimation section 504.

On the other hand, the control unit 112 obtains information indicating the temperature of the CCD 102 from a temperature sensor unit 114 and transfers the obtained temperature information to the noise amount estimation section 504.

The noise amount estimation section 504 estimates the amount of temporal noise on the basis of the minimum difference value $D_{min}$ of each pixel transferred from the minimum difference value detection section 502, gain information from the gain calculation section 503, and the temperature information from the control unit 112 under the control of the control unit 112.

FIG. 11 is a plot of a modeled relationship between temporal noise amount N and minimum difference value $D_{min}$ of a signal value at a temperature t at three kinds of gains.

The temporal noise amount N is 0 when the minimum difference value $D_{min}$ of the signal value is 0, and monotonously increases in a substantial quadratic curve as the minimum difference value $D_{min}$ increases. The temporal noise amount N takes certain values $N_{m1}$, $N_{m2}$ and $N_{m3}$ when the minimum difference value $D_{min}$ reaches a difference threshold value $D_1$ at a first gain, a difference threshold value $D_2$ at a second gain, and a difference threshold value $D_3$ at a third gain, respectively. The purpose of the noise model taking the certain values when the minimum difference value reaches the certain threshold values $N_{m1}$, $N_{m2}$, $N_{m3}$ is to separate a motion component.

The temporal noise amount model as illustrated in FIG. 11 can be modeled by a quadratic function as the following equation 8:

$$N = a \times D_{min}^2 + b \times D_{min} + c \text{ (when } D_{min} < D_x)$$

$$N = N_{mx} \text{ (when } D_{min} \geq D_x) \quad \text{[Equation 8]}$$

where a, b and c are constants that are dependent on temperature and gain and $D_x$ is a difference threshold value for detecting motion. The difference threshold value $D_x = D_1$ at the first gain, $D_x = D_2$ at the second gain, and $D_x = D_3$ at the third gain. Here, $N_{mx}$ is a constant value associated with each difference threshold value $D_x$. The constants a, b and c have been predetermined so that the condition $N \leq N_{mx}$ is satisfied.

Noise models as described above are stored in the ROM 110 beforehand.

The noise amount estimation section 504 retrieves an appropriate noise model from the ROM 110 on the basis of temperature information and a gain from the control unit 112 and estimates a noise amount corresponding to the minimum difference value $D_{min}$ from the minimum difference value detection section 502.

Storing multiple different functions like the function illustrated in Equation 8 for different temperatures and gains requires a huge amount of memory. In addition, obtaining the amount of noise by further calculation adds complexity to the process. Therefore, as in the first embodiment, a model that provides a maximum noise amount may be set as a reference noise model. The reference model may be approximated by a predetermined number of line segments and a reference noise amount calculated by interpolation based on the line segments may be corrected on the basis of temperature and gain.

Using such a noise model to estimate the amount of noise enables the speedy processing to be performed at low cast in a power saving manner.

Then the noise amount estimation section 504 transfers the estimated temporal noise amount N to the temporal noise removal section 302.

Then the temporal noise removal section 302 performs, under the control of the control unit 112, temporal noise removal processing on the basis of temporal noise amount information for each pixel from the temporal noise detection section 1301 and an image signal from the spatial noise reduction unit 106 that has been subjected to spatial noise reduction processing. The temporal noise removal section 302 transfers the image signal to which temporal noise removal processing has been applied to the output unit 108 and the previous buffer unit 1109.

While the amount of noise is estimated on the basis of the difference value between an image signal of the current frame to which spatial noise reduction processing has been applied and a previous image signal to which spatial noise reduction processing and temporal noise reduction processing have been applied and the estimated amount of noise is used to perform temporal noise reduction process, the present invention is not limited to such a configuration. For example, as in the first embodiment described above, the amount of noise may be estimated on the basis of the average value between an image signal of the current frame to which spatial noise reduction processing has been applied and a previous image signal to which spatial noise reduction processing and temporal noise reduction processing have been applied, as illustrated in FIGS. 4 to 7, and may be used to perform temporal noise reduction processing.

According to the second embodiment, as in the first embodiment described above, since spatial noise reduction processing is first applied to a frame image on the basis of a spatial noise model without regard for separation of motion components, random noise in the same frame can be stably reduced.

Furthermore, since random noise of an image signal to which spatial noise reduction has been applied can be separated from motion component in a temporal direction with a high precision, noise remaining after the spatial noise reduction processing can be reduced with a high precision to provide a high-quality image signal.

The introduction of noise models increases compatibility among different kinds of moving image pickup systems and therefore the present invention can be advantageously applied to a wide variety of moving image pickup systems.

While a three-CCD is used in the embodiments described above, the technique described above is also applicable to video signals converted to RGB color signals in an implementation using a single-CCD or a two-CCD. In addition, the image sensor is not limited to a CCD. A CMOS image sensor or any of other types of image sensors may be used.

While the present invention has been described mainly with respect to moving image noise reduction processing apparatuses, the present invention may be embodied as a computer-readable recording medium on which a program for moving image noise reduction processing to cause a computer to perform the same processing or as a moving image noise reduction processing method for accomplishing the same processing.

The present invention is not limited to the embodiments described above. The present invention can be embodied by modifying any of components thereof in a practical phase without departing from the spirit of the present invention. By combining components disclosed in the above-described embodiments as appropriate, various implementations of the invention can be made. For example, some of the components given in the embodiments may be omitted. Furthermore, components in different embodiments may be combined as appropriate. It will be understood that various modifications and applications are possible without departing from the spirit of the present invention.

What is claimed is:

1. A moving image noise reduction processing apparatus for reducing noise in a digitalized time-series image signal, comprising:
   a spatial noise reduction unit applying spatial noise reduction processing to the image signal;
   an image signal storage unit storing an image signal to which at least the spatial noise reduction processing has been applied; and
   a temporal noise reduction unit performing temporal noise reduction processing based on an image signal to be processed to which the spatial noise reduction processing has been applied in the spatial noise reduction unit and an image signal which is stored in the image signal storage unit and is earlier than the image signal to be processed;
   wherein the temporal noise reduction unit comprises:
      a temporal noise amount detection unit detecting an amount of temporal noise in a pixel of interest in an image signal to be processed to which the spatial noise reduction processing has been applied, by using the previous image signal based on a temporal noise model; and
      a temporal noise removal processing unit applying noise removal processing to a pixel of interest in an image signal to be processed to which the spatial noise reduction processing has been applied, based on the amount of temporal noise detected in the temporal noise amount detection unit; and
   wherein:
   the digitalized time-series image signal is obtained by picking up an image by an image sensor at a predetermined frame rate, amplifying by a predetermined gain, and being digitalized;
   the temporal noise amount detection unit comprises a representative value estimation unit estimating a representative value of the pixel of interest based on an image signal to be processed to which the spatial noise reduction processing has been applied and at least one of one or more previous image signals stored in the image signal storage unit;
   the temporal noise model is generated by modeling a relationship between the representative value and an amount of noise and is dependent on at least one of items of information indicating a temperature of the image sensor at the time when the image signal has been picked up, a gain for the image signal, and a frame rate of the time-series image signal; and
   the temporal noise amount detection unit further comprises a temporal noise amount calculation unit calculating an amount of temporal noise based on the temporal noise model by using the representative value of the pixel of interest estimated in the representative value estimation unit and at least one of items of information indicating a temperature of the image sensor at the time when the image signal has been picked up, a gain for the image signal, and a frame rate of the time-series image signal.

2. The moving image noise reduction processing apparatus according to claim 1, wherein the image signal storage unit stores an image signal to which at least the spatial noise reduction processing and the temporal noise reduction processing have been applied.

3. The moving image noise reduction processing apparatus according to claim 2, wherein
   the representative value estimation unit comprises a difference value calculation unit calculating a difference value between a pixel of interest in an image signal to be processed to which the spatial noise reduction processing has been applied and a pixel that is in at least one of one or more previous image signals stored in the image signal storage unit and corresponds to the pixel of interest, and estimates the representative value based on a minimum difference value among one or more difference values calculated in the difference value calculation unit.

4. The moving image noise reduction processing apparatus according to claim 1, wherein the representative value estimation unit comprises an average value calculation unit calculating an average value between a pixel of interest in an image signal to be processed to which the spatial noise reduction processing has been applied and a pixel that is in at least one of one or more previous image signals stored in the image signal storage unit and corresponds to the pixel of interest and estimates the representative value of based on the average value calculated by the average value calculation unit.

5. The moving image noise reduction processing apparatus according to claim 1, wherein the spatial noise reduction unit comprises:
   a spatial noise amount detection unit detecting an amount of spatial noise in a pixel of interest in the image signal to be processed based on a spatial noise model; and
   a spatial noise removal processing unit applying noise removal processing to the pixel of interest based on the amount of spatial noise detected in the spatial noise amount detection unit.

6. A non-transitory computer-readable recording medium on which a moving image noise reduction processing program for reducing noise in a digitalized time-series image signal is recorded, the moving image noise reduction processing program controlling functions comprising:
   a spatial noise reduction step of applying spatial noise reduction processing to the image signal;
   an image signal storage step of storing an image signal to which at least the spatial noise reduction processing has been applied; and
   a temporal noise reduction step of performing temporal noise reduction processing based on an image signal to be processed to which the spatial noise reduction processing has been applied in the spatial noise reduction step and an image signal which is stored in the image signal storage step and is earlier than the image signal to be processed;
   wherein the temporal noise reduction step comprises:
      a temporal noise amount detection step of detecting an amount of temporal noise in a pixel of interest in an image signal to be processed to which the spatial noise reduction processing has been applied, by using the previous image signal based on a temporal noise model; and
      a temporal noise removal processing step of applying noise removal processing to a pixel of interest in an image signal to be processed to which the spatial noise reduction processing has been applied, based on the amount of temporal noise detected in the temporal noise amount detection step; and
   wherein:
   the digitalized time-series image signal is obtained by picking up an image by an image sensor at a predetermined frame rate, amplified by a predetermined gain, and being digitalized;
   the temporal noise amount detection step comprises a representative value estimation step of estimating a representative value of the pixel of interest based on an image signal to be processed to which the spatial noise reduction processing has been applied and at least one of one or more previous image signals stored in the image signal storage step;

the temporal noise model is generated by modeling a relationship between the representative value and an amount of noise and is dependent on at least one of items of information indicating a temperature of the image sensor at the time when the image signal has been picked up, a gain for the image signal, and a frame rate of the time-series image signal; and the temporal noise amount detection step further comprises a temporal noise amount calculation step of calculating an amount of temporal noise based on the temporal noise model by using the representative value of the pixel of interest estimated in the representative value estimation step and at least one of items of information indicating a temperature of the image sensor at the time when the image signal has been picked up, a gain for the image signal, and a frame rate of the time-series image signal.

7. The non-transitory computer-readable recording medium according to claim 6, wherein the image signal storage step stores an image signal to which at least the spatial noise reduction processing and the temporal noise reduction processing have been applied.

8. The non-transitory computer-readable recording medium according to claim 7, wherein the representative value estimation step includes calculating a difference value between a pixel of interest in an image signal to be processed to which the spatial noise reduction processing has been applied and a pixel that is in at least one of one or more previous image signals stored in the image signal storage step and corresponds to the pixel of interest, and estimates the representative value based on a minimum difference value among one or more difference values calculated in the difference value calculation step.

9. The non-transitory computer-readable recording medium according to claim 6, wherein the representative value estimation step includes calculating an average value between a pixel of interest in an image signal to be processed to which the spatial noise reduction processing has been applied and a pixel that is in at least one of one or more previous image signals stored in the image signal storage step and corresponds to the pixel of interest, and estimates the representative value based on the average value calculated in the average value calculation step.

10. The non-transitory computer-readable recording medium according to claim 6, wherein the spatial noise reduction step comprises:

a spatial noise amount detection step of detecting an amount of spatial noise in a pixel of interest in the image signal to be processed based on a spatial noise model; and a spatial noise removal processing step of applying noise removal processing to the pixel of interest based on the amount of spatial noise detected in the spatial noise amount detection step.

11. A moving image noise reduction processing method for reducing noise in a digitalized time-series image signal, the method comprising:

applying spatial noise reduction processing to the image signal;

storing an image signal to which at least the spatial noise reduction processing has been applied; and performing temporal noise reduction processing based on an image signal to be processed to which the spatial noise reduction processing has been applied and an image signal which is stored and is earlier than the image signal to be processed;

wherein performing the temporal noise reduction processing comprises:

detecting an amount of temporal noise in a pixel of interest in an image signal to be processed to which the spatial noise reduction processing has been applied, by using the previous image signal based on a temporal noise model; and applying noise removal processing to a pixel of interest in an image signal to be processed to which the spatial noise reduction processing has been applied, based on the detected amount of the temporal noise; and wherein:

the digitalized time-series image signal is obtained by picking up an image by an image sensor at a predetermined frame rate, amplified by a predetermined gain, and being digitalized;

detecting the amount of temporal noise comprises estimating a representative value of the pixel of interest based on an image signal to be processed to which the spatial noise reduction processing has been applied and at least one of one or more stored previous image signals;

the temporal noise model is generated by modeling a relationship between the representative value and an amount of noise and is dependent on at least one of items of information indicating a temperature of the image sensor at the time when the image signal has been picked up, a gain for the image signal, and a frame rate of the time-series image signal; and detecting the amount of temporal noise further comprises calculating an amount of temporal noise based on the temporal noise model by using the estimated representative value of the pixel of interest and at least one of items of information indicating a temperature of the image sensor at the time when the image signal has been picked up, a gain for the image signal, and a frame rate of the time-series image signal.

12. The method according to claim 11, wherein storing the image signal includes storing an image signal to which at least the spatial noise reduction processing and the temporal noise reduction processing have been applied.

13. The method according to claim 12, wherein estimating the representative value includes calculating a difference value between a pixel of interest in an image signal to be processed to which the spatial noise reduction processing has been applied and a pixel that is in at least one of one or more previous stored image signals and corresponds to the pixel of interest, the representative value being estimated based on a minimum difference value among one or more calculated difference values.

14. The method according to claim 11, wherein estimating the representative value includes calculating an average value between a pixel of interest in an image signal to be processed to which the spatial noise reduction processing has been applied and a pixel that is in at least one of one or more previous stored image signals and corresponds to the pixel of interest, the representative value being estimated based on the calculated average value.

15. The method according to claim 11, wherein applying the spatial noise reduction processing comprises:

detecting an amount of spatial noise in a pixel of interest in the image signal to be processed based on a spatial noise model; and applying noise removal processing to the pixel of interest based on the detected amount of spatial noise.

\* \* \* \* \*